United States Patent [19]
Higuchi et al.

[11] Patent Number: 5,747,640
[45] Date of Patent: May 5, 1998

[54] CONTINUNOUS PROCESS FOR PREPARING POLYTETRAFLUOROETHLENE WET POWDER

[75] Inventors: Tetsuya Higuchi, Ibaraki; Shunichi Nomura, Kyoto; Shigeru Ichiba, Ibaraki; Hiroshi Yamaguchi, Settsu; Masaomi Goromaru, Neyagawa; Akira Watanabe; Kazuhiro Takeda, both of Ibaraki; Mikio Morita, Kobe; Kazuhisa Fujita; Yasuyuki Moriyama, both of Ibaraki, all of Japan

[73] Assignee: Daikin Industries, Osaka, Japan

[21] Appl. No.: 537,329

[22] Filed: Oct. 2, 1995

Related U.S. Application Data

[63] Continuation of Ser. No. 229,425, Apr. 12, 1994, abandoned, which is a continuation of Ser. No. 794,650, Nov. 18, 1991, abandoned, which is a continuation of Ser. No. 492,016, Mar. 12, 1990, abandoned.

[30] Foreign Application Priority Data

Mar. 14, 1989 [JP] Japan ............................. 1-61866

[51] Int. Cl.$^6$ ........................................ C08F 6/18
[52] U.S. Cl. ........................ 528/502 F; 528/502 R; 526/255; 523/322
[58] Field of Search ................ 528/502 R, 502 F; 526/255; 523/322

[56] References Cited

U.S. PATENT DOCUMENTS

| | | | |
|---|---|---|---|
| 3,046,263 | 7/1962 | Whitlock | 528/502 |
| 3,766,133 | 10/1973 | Roberts et al. | 524/546 |
| 4,439,385 | 3/1984 | Kuhls et al. | 264/37 |
| 4,713,443 | 12/1987 | Nakashima et al. | 528/502 |

FOREIGN PATENT DOCUMENTS 2315942  4/1972  Germany.

Primary Examiner—Fred Teskin
Attorney, Agent, or Firm—Armstrong, Westerman Hattori, McLeland & Naughton

[57] ABSTRACT

A process for continuously preparing a wet powder of PTFE, comprising the step of continuously slurrying a PTFE aqueous dispersion with a high shear machine, and the step of continuously granulating the slurry by using vertical agitator. The process can be carried out for a long time without trouble, and can continuously provide a dry powder having good powder properties. The powder properties can be controlled by regulating operation conditions.

9 Claims, 2 Drawing Sheets ps
CONTINUNOUS PROCESS FOR PREPARING POLYTETRAFLUOROETHLENE WET POWDER This application is a continuation of application Ser. No. 08/229,425 filed Apr. 12, 1994, abandoned, which is a continuation of application Ser. No. 07/794,650 filed Nov. 18, 1991, abandoned, which is a continuation of application Ser. No. 07/492,016 filed Mar. 12, 1990, abandoned.

BACKGROUND OF THE INVENTION

The present invention relates to a continuous preparation process of polytetrafluoroethylene wet powder.

Polytetrafluoroethylene (hereinafter referred to as "PTFE") dispersions are prepared by emulsion-polymerizing tetrafluoroethylene and are present in a form of aqueous dispersion in which fine particles of the emulsion-polymerized product having a particle size of 0.1 to 0.5 μm are dispersed. It is difficult to obtain a PTFE fine powder directly from the aqueous dispersion, and also if possible, the resulting separated and dried powder is worse in handling. Therefore, hitherto a product (dry powder) of fine powder is prepared by applying a shear to the aqueous dispersion, flocculating the dispersed fine particles to produce a slurry, granulating the slurry with stirring to give a wet powder (these sequencial steps being, hereinafter, referred to as "agglomeration process"), and then drying the wet powder.

The agglomeration process is carried out by batch system or continuous system. In the batch system, the slurrying and granulation of the aqueous dispersion is carried out by only agitating in one agitation tank. This system, however, is inferior in workability and further the controlling of properties of the product such as an apparent density is difficult.

The continuous system is proposed in U.S. Pat. No. 3,046,263 and is a process by using a centrifugal pump and a capillary and a horizontal cylindrical agitation tank. According to this process, a PTFE aqueous dispersion is introduced to the capillary through the centrifugal pump to produce a slurry by shearing due to velocity gradient, and then the obtained slurry is granulated by the horizontal agitation tank to give a wet powder.

The prior continuous agglomeration system has, however, the following disadvantages. Namely, since the aqueous dispersion is supplied through the centrifugal pump to the capillary, when the centrifugal pump applies a shear, the fine particles partially flocculate to plug the capillary. Therefore, the capillary must be frequently changed due to plugging. Further, the shear velocity gradient becomes sometimes ununiform to give aggromelates having a wide particle size distribution. Amount of unagglomerated fine particles is not negligible. The horizontal agitation tank used for granulation usually has a both end supported shaft, and proper sealing is required at the end supports. In the agitation tank, the granules are taken off by introducing air into the agglomerates to rise to the surface. The floated granules, however, are broken by the agitation blades, and thus the produced powder becomes fine or deformed in shape. When an amount of fine powder is increased, an apparent density of the product powder becomes low, which makes handling property bad.

Accordingly, the production of PTFE powder is now carried out mainly by the batch system.

SUMMARY OF THE INVENTION

The present invention can provide a process for continuously preparing a PTFE wet powder for a long time, and comprises a step of slurrying an aqueous PTFE dispersion by continuously supplying the dispersion to a high shear machine, and a step of continuously supplying the slurry to a lower portion of a vertical agitator to granulate with stirring and taking off the produced wet powder from a upper portion of the agitator.

According to the present invention, the particle size and the apparent density of the product powder can be controlled, and there can be provided a wet powder having a low water content.

In addition, according to the present invention, since the wet powder can be obtained continuously, a dry powder (product powder) can be continuously obtained by continuous drying of the wet powder.

DETAILED DESCRIPTION

Figure 1:
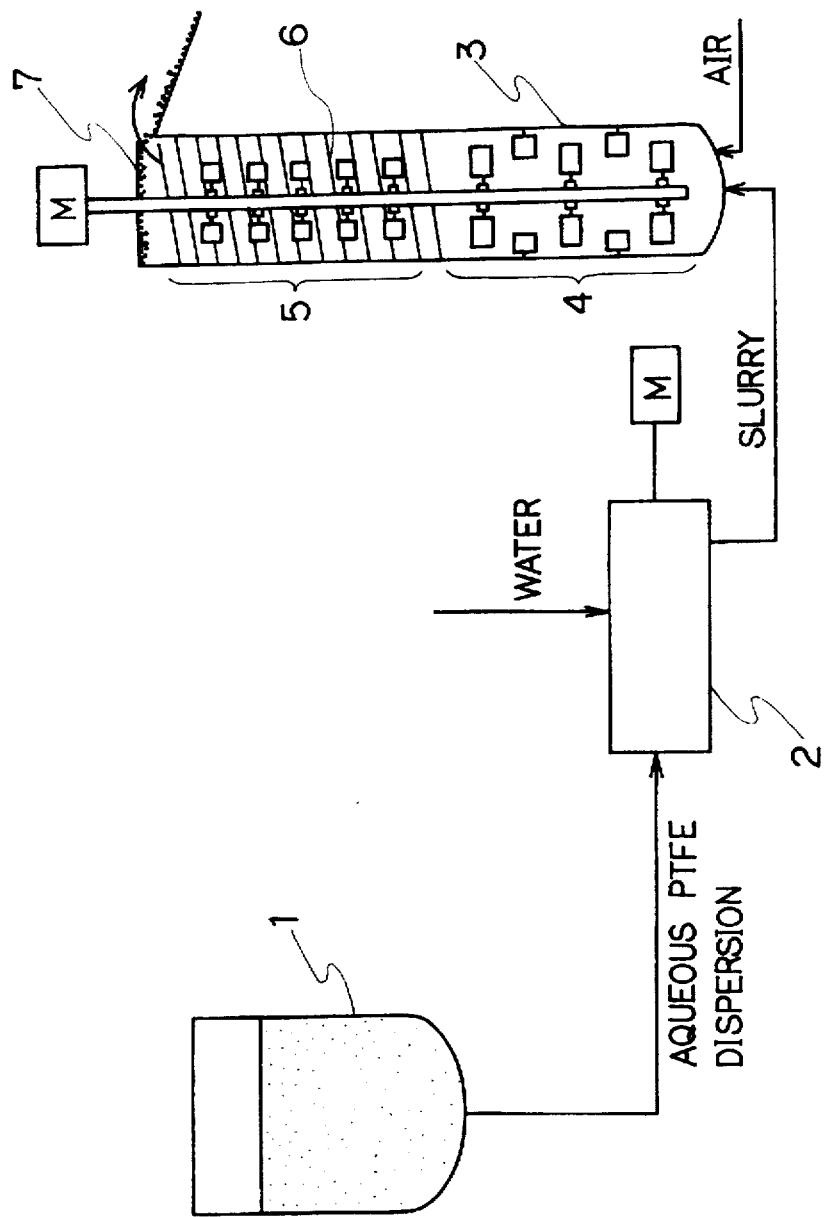
FIG. 1 shows a schematic block diagram of the process of the present invention.

As mentioned above, in the course of the agglomeration process there occurs the phase change, i.e. dispersion→slurry→wet powder+water. In the batch system all of the phase change are done in one agitation tank, while in the above-mentioned prior continuous system, the first stage is carried out by the capillary and the last stage is carried out by the horizontal agitation tank. On the other hand, according to the process of the present invention, the first stage is carried out by a high shear machine, and the subsequent last stage is carried out by a vertical agitator. A block diagram of one embodiment is shown in FIG. 1.

The aqueous PTFE dispersion is continuously supplied from a tank 1 to a high shear machine 2, and the PTFE fine particles are flocculated during passing through the shear machine 2 to give a slurry. At this time, water, preferably deionized water may be flushed to a sliding portion of the shear machine in order to seal the sliding portion, as described hereinbelow. The obtained slurry is then supplied to a lower portion of a vertical agitator 3.

The vertical agitator has at least one stage or set of agitation blades, and can produce a wet powder by granulating the flock in the slurry. At the time, air engulfed by agitation is entrapped in the granulated wet powder, and the wet powder 7 rises to the surface by its buoyancy. The water content of wet powder can be controlled by supplying an additional air from the lower portion of the agitator during the granulation step.

For efficiently producing a wet powder having a good flowability, the vertical agitator may comprise a granulating zone 4 which is defined by the lower portion of the agitator, and a particle shaping zone 5 which is defined by the upper portion, where the shape and size of the granules are regulated. When arranging a spiral flow guide plate 6 on the inside wall of the agitator in the shaping zone 5, a smooth spiral upward stream can be obtained, whereby the particle shaping and the continuous quantatative discharge can be efficiently accomplished.

The PTFE wet powder 7 prepared by these agglomeration procedures may generally be taken off continuously and quantatatively from the agitator 3 with water by a usual method such as overflow method. The discharged wet powder 7 is separated from water by a wire net (not shown) and the like, and then dried. Alternatively, the wet powder is collected on a wire net belt conveyor to separate from water, and continuously dried thereon to obtain a dry powder.

As mentioned above, according to the present invention, the PTFE wet powder and also the dry powder can be continuously prepared.

The high shear machine can convert the aqueous PTFE dispersion to a slurry by momentarily applying a uniform high shear to the dispersion. Since the uniform high shear can be applied momentarily, the uniform flock or agglomerate can be obtained. In the event, there can be obtained more uniform slurry in comparison with the slurry obtained according to the batch system which requires a long time agitation and the slurry according to the prior capillary method in which a shear becomes sometimes non-uniform. In addition, since a shear can be changed by means of a rotation speed of the mixer, the degree of slurrying can be easily controlled, and thus the apparent density and particle size of the final product (dry powder) can be easily regulated.

The high shear machine used in the present invention has a highly rotating mixing blade and a stator, and there is a very slight clearance between the mixing blade and the stator. In the very slight clearance a velocity gradient is generated by the blade and stator, whereby the PTFE dispersion in the very slight clearance subjects the dispersion to a great shear. Instead of the stator there may be employed a rotor which rotates in the opposite direction. Also the shear machine may be constructed such that a mixing shell itself has a very slight clearance from a rotating agitation blade. Preferred nonrestrictive examples of the high shear machine are a pipe line mixer, a pipe line mill and any machine which can apply a high shear momently. The high shear machine may be operated under the conditions that the dispersion can be converted to a slurry without producing a wet powder in the shear machine, and the operation conditions may be determined by a rotation speed. For obtaining a uniform high shear, when a clearance of the stator is around 0.5 mm, a peripheral speed of the mixing blade is within a range of 2 to 30 m/sec, preferably 6 to 10 m/sec. Also, a concentration of the polymer at an inlet of the shear machine or in the shear machine is controlled to 5 to 20% (% by weight, hereinafter the same), preferably 8 to 15%.

In the pipe line mixer the PTFE particles may deposit on sliding parts of the mixing blade or stator. In such a case, water, preferably a deionized water is flushed to the sliding parts from the stator to effect water seal. The flushed water is useful for controlling a PTFE concentration of a slurry, because the PTFE concentration after the slurrying may give some effects to the next granulation step, as described hereinafter.

Figure 2:
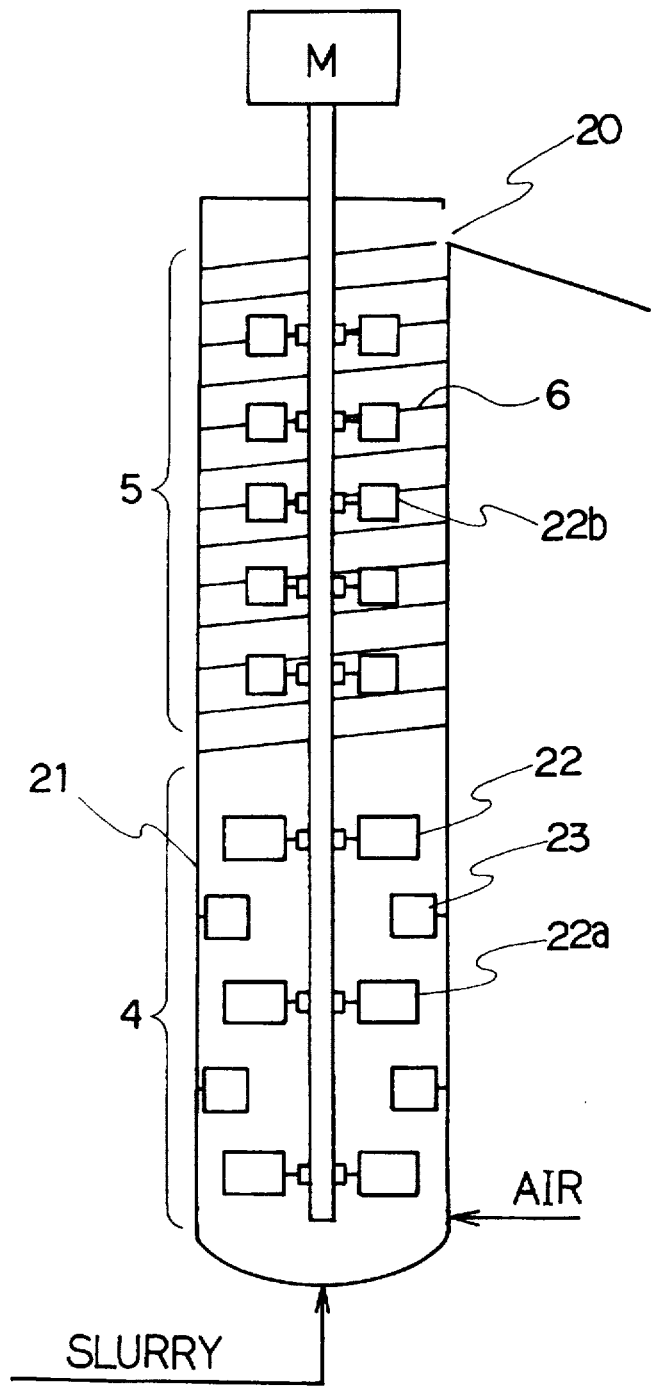
FIG. 2 shows a schematic cross-sectional view of an embodiment of a vertical agitator used in the present invention.

The vertical agitator used for granulation and shaping comprises, as shown in FIG. 2, an agitation tank 21 with an overflow means 20 at its upper portion and an agitating apparatus which is constructed by arranging paddle blades 22 to an agitation axis in a form of multiple stages. The agitating apparatus is inserted downward to the agitator from the upper portion. In this embodiment, the lower half of the agitator defines a granulating zone 4 and the upper half defines a particle shaping zone 5. In the granulating zone 4, since a relatively large shear is required for granulation, baffle plates 23 are preferably arranged in addition to the paddle blades 22a. Also, it is effective that an angle of the paddle blades can be regulated for controlling the shear.

To the granulating zone 4, air is preferably introduced from the lower portion thereof. The air introduction during the granulation step can aid the rising of the granules in which air is entrapped, and surprisingly can reduce a water content of the wet powder. Amount of the introducing air may be about 0 to 1.0 l/min/kg PTFE.

The granulated PTFE particles are rising to the particle shaping zone 5. In the shaping zone the uniform wet powder can be obtained by applying a relatively small shear and controlling a residence time to a sharp distribution. Accordingly, a diameter of the paddle blade 22b in the shaping zone 5 is shorter than that in the granulating zone 4. In order to make the flow of granules smooth to achieve a sharp distribution of residence time, the spiral flow guide plate 6 is provided on the inside wall of the agitator. For improving the smooth flow, the pitch of the flow guide plate 6 may become wider in the upper portion.

Though the vertical agitator used in the present invention is explained by the embodiment of FIG. 2, the vertical agitator usable in the present invention is not limited to the embodiment. The usable agitator may be an agitator which has a vertical agitation axis and at least one stage of agitation blades. Also, the agitator may consist only of the granulating zone, in such a case an additional agitator may be employed for particle shaping.

The obtained PTFE wet powder has a reduced water content and a good flowability, and is excellent in handling after drying.

The wet powder can be continuously taking off from the vertical agitator by a proper discharge means. As the discharge means, there may be employed an overflow method and a quantatative scraping method such as a scraper method, particularly an overflow method. The discharged wet powder is separated from water, followed by drying. The water separating step and the drying step can be continuously carried out. For example, the wet powder and water which are overflowed are colleted on a wire net belt conveyor to separate from water, and the wet powder is continuously conveyed to a dryer to produce a dry powder.

According to the process of the present invention, as described above, since a water content of the wet powder can be reduced, energy and time for drying can be decreased. Further, a dry powder having a controlled particle size and apparent density and a good flowability can be provided.

The aqueous PTFE dispersion used in the present invention is an aqueous dispersion prepared by emulsion polymerization having a polymer concentration of approximately 5 to 50%. The dispersion is generally fed to the high shear machine at a temperature of about 5° to 50° C. to give a slurry having a polymer concentration of approximately 5 to 20%, preferably 8 to 15%. The water for controlling the concentration, preferably a deionized water, may be added as a flushing water to the shear machine or may be added separately.

The wet powder obtained according to the presnt invention has a water content of 40 to 80 % which is greatly lower than a water content of about 95% according to the batch system. The dry powder prepared after drying can be controlled of a particle size within a range of 400 to 1200 μm and an apparent density within a range of 0.25 to 0.70 g/cc. Particularly, a dry powder having an apparent density of not less than 0.45 g/cc has a particularly exellent flowability.

The process of the present invention can be widely employed for a preparation of a powder from a dispersion. For example, the process is applicable to a fluorine rubber of vinylidene fluoride-hexafluoropropylene, a copolymer of tetrafluoroethylene-hexafluoropropylene, and the like.

The present invention is more specifically described and explained by means of the following Examples. It is to be understood that the present invention is not limited to those Examples, and may be made various changes and modifications without departing from the scope or spirit of the present invention.

EXAMPLE 1

An aqueous PTFE dispersion (13.9° C.) containing PTFE particles (average particle size 0.25 μm) at a concentration of 30% was fed to the pipe line mixer (described hereinbelow) at a flow rate of 2.4 kg/min by regulating a flow rate with a diaphram type controlling valve. The pipe line mixer was operated at a rotation speed of 3500 rpm (tip speed of the turbine 7.8 m/sec). In the pipe line mixer a deionized water (27.3° C.) was flushed at a flush rate of 4.4 l/min. from three nozzles arranged in the stator.

The PTFE slurry drained from the pipe line mixer had a temperature of 23° C. and a polymer concentration of 10%. The slurry was fed to the vertical agitator described hereinbelow. In the agitator, agitation was carried out at 400 rpm. From the lower portion of the agitator air (20° C.) was bubbled thereto at 10 l/min and a wet powder thus prepared was overflowed from the upper portion together with water. The obtained wet powder had a water content of 42% and was continuously discharged at 0.64 kg (dry weight) per minute. Further, there was no trouble such as plugging even when continuously operating for twenty hours.

The wet powder was colleted by separating from water with a wire net, followed by drying with a box type dryer (available from Daikin Industries, Ltd.) at 130° C. for 18 hours to obtain a dry powder having an apparent density of 0.54 g/cc and an average particle size of 630 μm. This powder had a good flowability and handling property.
(Pipe line mixer)

Type: PL-2SL, T.D. Pipe Line Homomixer (available from Tokushukika Kogyo Kabushiki Kaisha)
Motor: 2.2 KW, 2P
Rotation speed: 360 to 6000 rpm (Inverter drive)
First turbine diameter: 42.6 mm (Max. peripheral speed 13.4 m/sec.)
Second turbine diameter: 48.0 mm (Max. peripheral speed 15.1 m/sec.)
Clearance between stator and turbine: 0.5 mm
(Vertical agitator)
Type: Vertical agitator available from Daikin Industries, Ltd.
Capacity: 29 l
Hight: 1212 mm
Inside diameter: 192 mm
Paddle blade in granulating zone
Diameter: 150 mm
Number of blades in one stage: 6
Number of stages: 3
Distance between the stages: 200 mm
Paddle blade in shaping zone
Diameter: 120 mm
Number of blades in one stage: 6
Number of stages: 5
Distance between the stages: 100 mm
Pitch of spiral flow guide plate: 40 to 60 mm
(Measuring method of apparent density)
According to JIS K 6891.

EXAMPLES 2 TO 5

Wet powders were prepared continuously and dried in the same manner as of Example 1 except that a concentration of aqueous PTFE dispersion, a rotation speed of the pipe line mixer, a temperature of slurry and a rotation speed of the vertical agitator were changed to the values shown in Table 1.

Water contents of the obtained wet powders and particle sizes and apparent densities of the dry powders are shown in Table 1.

EXAMPLES 6 TO 8

Wet powders were prepared continuously and dried in the same manner as of Example 1 except that bubbling amounts of air were changed to the values shown in Table 2.

Water contents of the obtained wet powders and particle sizes and apparent densities of the dry powders are shown in Table 2.

TABLE 1

| | Operating Condition | | | | | | Properties of Powder | | |
|---|---|---|---|---|---|---|---|---|---|
| | | Temp. | Pipe line mixer | | | Rotation speed of vertical agitator (rpm) | Water cont. of wet powder (%) | Dry powder | |
| Ex. No. | Polymer conc. (%) | of slurry (°C.) | Rotation speed (rpm) | Peripheral speed of 1st turbine (m/sec) | Amount of air (l/min) | | | Apparent density (g/cc) | Ave. particle size (μm) |
| 1 | 10.0 | 23 | 3500 | 7.8 | 10 | 400 | 42 | 0.54 | 630 |
| 2 | 15.0 | 23 | 3500 | 7.8 | 10 | 400 | 55 | 0.55 | 1000 |
| 3 | 11.0 | 17 | 3500 | 7.8 | 10 | 400 | 65 | 0.40 | 420 |
| 4 | 10.0 | 23 | 2900 | 6.5 | 10 | 400 | 60 | 0.45 | 590 |
| 5 | 10.0 | 23 | 3500 | 7.8 | 10 | 350 | 75 | 0.44 | 750 |

TABLE 2

| | Operating Condition | | | | | Properties of Powder | | |
|---|---|---|---|---|---|---|---|---|
| | | | Pipe line mixer | | | Rotation | | |
| | | Temp. | | Peripheral | | speed of | Dry powder | | |
| Ex. No. | Polymer conc. (%) | of slurry (°C.) | Rotation speed (rpm) | speed of 1st turbine (m/sec) | Amount of air (l/min) | vertical agitator (rpm) | Water cont. of wet powder (%) | Apparent density (g/cc) | Ave. particle size (μm) |
| 6 | 12.0 | 27 | 2800 | 6.2 | 0 | 380 | 66 | 0.44 | 910 |
| 7 | 12.0 | 27 | 2800 | 6.2 | 10 | 380 | 53 | 0.45 | 520 |
| 8 | 12.0 | 27 | 2800 | 6.2 | 20 | 380 | 50 | 0.44 | 490 |

According to the process of the present invention a wet powder and further a dry powder can be continuously prepared from an aqueous PTFE dispersion and the process can be operated for a long time. Therefore, there are various advantages such that a treating time can be shortened, that a preparation plant can be made compact, and that a labor cost can be decreased. In addition, by controlling the operation conditions of the high shear machine and vertical agitator, powder properties can be controlled. Further, since the obtained wet powder has a low water content, energy for drying can be reduced.

What we claim is:

1. A continuous process for preparing polytetrafluoroethylene wet powder, which consists essentially of: continuously passing an aqueous dispersion of polytetrafluoroethylene fine particles prepared by emulsion polymerization through a pipe line mixer or a pipe line mill to form a slurry containing flocculated polytetrafluoroethylene; continuously supplying the slurry to a lower portion of a vertical agitator; continuously granulating the flocculated polytetrafluoroethylene in a granulating zone having multistate agitation blades mounted on a central vertical shaft inside the lower half of the vertical agitator; continuously shaping the granular polytetrafluoroethylene particles in a particle shaping zone having a spiral flow guide in the upper half of the vertical agitator; and continuously taking off polytetrafluoroethylene wet powder from an upper portion of the vertical agitator.

2. The process of claim 1, wherein shear applied to the granulating zone is larger than shear applied to the particle shaping zone in the vertical agitator.

3. The process of claim 1, wherein baffle plates are provided in the granulating zone.

4. The process of claim 1, wherein the fine particles prepared by emulsion polymerization have a particle size of 0.1 to 0.5 μm.

5. The process of claim 1, wherein the multistage agitation blades are paddle blades.

6. The process of claim 1, wherein the vertical agitator has an overflow means at its upper portion and multistage agitation blades mounted on a central vertical shaft inside the vertical agitator.

7. The process of claim 1, wherein the particle shaping zone has multistage agitation blades mounted on a central vertical shaft inside the vertical agitator.

8. The process of claim 1, wherein the granulating zone has multistage baffle plates between stages of the multistage agitation blades.

9. The process of claim 1, wherein a rotation speed of the pipe line mixer or the pipe line mill is from 2800 to 3500 rpm.

* * * * *